Feb. 13, 1951     C. NORMANDIN     2,541,604
LID OR COVER HOLDER
Filed Aug. 30, 1946

Inventor
CAMILLE NORMANDIN
By
McMorrow, Berman & Davidson
Attorneys

Patented Feb. 13, 1951

2,541,604

UNITED STATES PATENT OFFICE 2,541,604

LID OR COVER HOLDER

Camille Normandin, Montreal, Quebec, Canada

Application August 30, 1946, Serial No. 694,037

2 Claims. (Cl. 220—85)

This invention relates to lid or cover holders for cooking vessels, utensils or the like and has for its primary object the provision of a holder which is extremely simple and inexpensive of construction and which is highly efficient in operation.

Another object is the provision of a lid holder to a utensil in such a manner that the holder can remain on the utensil without interfering with placing the lid in a position to close the utensil.

A still further object is the provision of a lid holder which supports the lid so that any moisture thereon will drain into the vessel.

Other objects, improved features of construction, and results obtainable from the invention appear from the following description when read in the light of the accompanying drawings.

Figure 1:
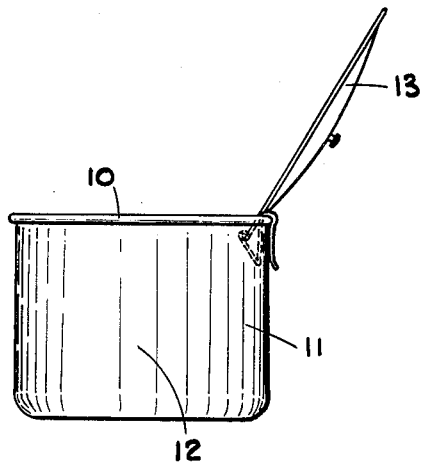
Fig. 1 is a side view illustrating the holder in combination with a vessel.
Figure 2:
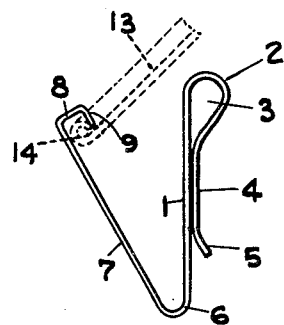
Fig. 2 is a side view of the holder, the edge of a vessel lid being shown in broken line.
Figure 3:
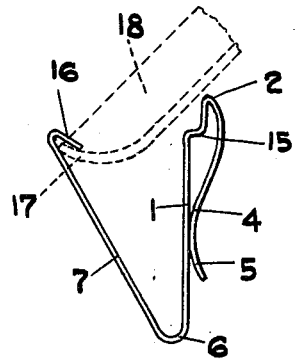
Fig. 3 is a view similar to Fig. 2 showing a slightly modified form of the invention.
Figure 4:
Fig. 4 is a front view of Fig. 2.

The invention is for use with any type of vessel in which the lid thereof is not attached by a hinge or the equivalent and is for the purpose of supporting the lid while the contents of the vessel are examined or stirred, or it is desired to be cooked with the lid removed.

The holder is composed of some suitable resilient material such as thin spring steel in strip form having a width preferably of one-fourth to three-eighths inches. The strip is continuous and is formed to provide, in the preferred form, an intermediate straight flat leg 1 whose upper end is bent outwardly and downwardly as at 2 to form a loop 3 and a continuation forming an outer leg 4 which normally contacts the outer face of the inner leg under resilient tension. The lowermost end of the outer leg is bent or flared outwardly as at 5.

The lower end of the intermediate leg is bent or curved as at 6 from which the inner leg 7 extends obliquely upwardly and terminates in an abutment formed by the leg at right angles to form a top 8 and again at right angles to form a side flange or lip 9.

In operation, the outer and intermediate walls of the holder telescopically receive the upper beaded edge 10 of the side wall 11 of the vessel 12 provided with a lid 13. This places the inner leg within the vessel with its abutment carrying end in a plane beneath the upper edge of the vessel.

The holder is held against displacement by its resilient clamping contact with the wall of the vessel. The lid is supported as shown in Fig. 1 by placing the beaded edge 14 thereof under the lip 9 of the abutment and inclining the lid so that it rests upon the upper edge of the vessel wall or more precisely upon the looped upper end connecting the outer and intermediate legs of the holder.

Thus it will be seen that the lid can be quickly and easily supported and will drain into the vessel and that the holder will not interfere with placing the lid in a closing position on the vessel.

The modified form of the invention differs from that described only in the following respects and is designed to operate with a vessel whose upper side wall edge is offset to provide a circumferential shoulder to support the lid. Here the upper end of the intermediate leg is provided with an offset 15 to accommodate the lid supporting shoulder while the free end of the inner leg is bent to form a hook or lip 16 adapted to overlie the lower peripheral edge 17 of the lid 18.

Modifications to accommodate vessels and lids of specifically different construction can be made without departing from the invention.

I claim:

1. A holder for holding a pot lid at an outwardly inclined angle with respect to the pot with the lower part of the lid rim positioned within the pot in draining relation thereto, said holder comprising a V-shaped member involving a pair of divergent legs, one of said legs having an extension on its upper end consisting of an outwardly and downwardly directed portion arranged to engage against the outer side of the wall of the pot with the said one leg engaged against the inner side of the wall of the pot, said extension having a part arranged to rest upon the upper edge of the pot wall whereby the holder is removably secured in place with the other leg of said member positioned within the pot and inclining inwardly away from the wall of the pot, the upper end of said other leg terminating in an outwardly and downwardly extending hook directed toward the said one leg for retainably engaging over the lower part of the rim of the pot lid within the pot whereby the pot lid is retained at an outwardly inclined angle with respect to the pot with a more elevated portion of the pot lid resting upon an elevated part of said one leg.

2. A device for holding a pot lid in an outwardly inclined position on the sidewall of a pot, said device comprising a length of relatively rigid material bent between its ends to provide a V-shaped form having divergent legs of substantially equal effective length, one of said legs comprising an extension on its upper end depending along the outer side thereof for engaging the outer side of the pot sidewall in opposition to engagement of the said one leg with the inner side of the pot sidewall with a part of said extension resting upon the upper edge of the pot sidewall, the other leg being bent downwardly at its upper end to provide a hook directed outwardly and downwardly toward the said one leg to engage over the lower part of the rim of a pot lid with a more elevated part of the pot lid inclining outwardly over an upper part of said first leg.

CAMILLE NORMANDIN.

REFERENCES CITED

The following references are of record in the file of this patent:

UNITED STATES PATENTS

| Number | Name | Date |
|---|---|---|
| 873,488 | De Beaumont et al. | Dec. 10, 1907 |
| 1,601,572 | Lester | Sept. 28, 1926 |
| 1,619,573 | Haines | Mar. 1, 1927 |
| 1,769,803 | Myers | July 1, 1930 |
| 1,928,995 | De Biasi | Oct. 3, 1933 |

FOREIGN PATENTS

| Number | Country | Date |
|---|---|---|
| 323,654 | Great Britain | Jan. 9, 1930 |
| 337,898 | Great Britain | Nov. 13, 1930 |
| 343,837 | Germany | Nov. 9, 1921 |
| 414,859 | Great Britain | Aug. 16, 1934 |